US010336365B2

(12) United States Patent
Füzes et al.

(10) Patent No.: US 10,336,365 B2
(45) Date of Patent: Jul. 2, 2019

(54) ELECTROMECHANICAL POWER STEERING SYSTEM

(71) Applicants: THYSSENKRUPP PRESTA AG, Eschen (LI); thyssenkrupp AG, Essen (DE)

(72) Inventors: Gergely Füzes, Budapest (HU); Attila Zoltán Konfár, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/569,266

(22) PCT Filed: Aug. 10, 2015

(86) PCT No.: PCT/EP2015/068379
§ 371 (c)(1),
(2) Date: Oct. 25, 2017

(87) PCT Pub. No.: WO2016/173680
PCT Pub. Date: Nov. 3, 2016

(65) Prior Publication Data
US 2018/0127023 A1 May 10, 2018

(30) Foreign Application Priority Data

Apr. 30, 2015 (DE) .................. 10 2015 208 081
Jul. 15, 2015 (DE) .................. 10 2015 213 304

(51) Int. Cl.
*B62D 5/04* (2006.01)
*H02P 25/22* (2006.01)
*H02P 29/032* (2016.01)

(52) U.S. Cl.
CPC ......... *B62D 5/0484* (2013.01); *B62D 5/0403* (2013.01); *B62D 5/0463* (2013.01);
(Continued)

(58) Field of Classification Search
CPC .... B62D 5/0484; B62D 5/0487; H02P 29/032
See application file for complete search history.

(56) References Cited

U.S. PATENT DOCUMENTS 6,693,405 B2    2/2004  Blanke
8,040,096 B2 *  10/2011 Taniguchi ............... H02M 1/32
                                                   318/490
(Continued)

FOREIGN PATENT DOCUMENTS

CN    101973311 A    2/2011
DE    10053335 A     5/2002
(Continued)

OTHER PUBLICATIONS

English Translation of International Search Report issued in PCT/EP2015/068379, dated Dec. 15, 2015 (dated Dec. 23, 2015).
English abstract for JP2014007784A.

*Primary Examiner* — Joseph M Rocca
*Assistant Examiner* — Michael R Stabley
(74) *Attorney, Agent, or Firm* — thyssenkrupp North America, Inc.

(57) ABSTRACT

An electromechanical power steering system for a vehicle may include an electric motor having a stator fitted with at least two electrical winding sets and having a rotor fitted with permanent magnets. The electric motor may exert a steering movement introduced by a driver on the vehicle. A main control unit may determine a motor current prespecification based on the steering movement. The motor current prespecification can be output to the electrical winding sets and may comprise a power control unit that provides and feeds the motor current prespecification to the winding sets. A driver control system may be provided for each winding set, wherein all driver control systems and the main control unit each have a microcontroller and are combined to form an assembly. A power driver may be connected to each of the
(Continued)

driver control systems, and at least two power drivers are arranged in a power control unit. Each power driver may be a half-bridge with power semiconductor switches.

16 Claims, 4 Drawing Sheets

(52) U.S. Cl.
CPC ............ *B62D 5/0487* (2013.01); *H02P 25/22* (2013.01); *H02P 29/032* (2016.02)

(56) References Cited

U.S. PATENT DOCUMENTS

| | | | | |
|---|---|---|---|---|
| 8,248,010 | B2* | 8/2012 | Mukai | B62D 5/0487 |
| | | | | 180/65.25 |
| 8,264,190 | B2 | 9/2012 | Suzuki | |
| 8,415,845 | B2 | 4/2013 | Miyachi | |
| 8,436,568 | B2 | 5/2013 | Mukai | |
| 8,528,689 | B2 | 9/2013 | Uryu | |
| 8,981,607 | B2* | 3/2015 | Suga | H02K 3/50 |
| | | | | 310/71 |
| 9,344,019 | B2* | 5/2016 | Furukawa | B62D 5/0403 |
| 2002/0057070 | A1 | 5/2002 | Thomsen | |
| 2010/0263953 | A1* | 10/2010 | Shimana | B60L 7/003 |
| | | | | 180/65.285 |
| 2011/0043152 | A1 | 2/2011 | Kidokoro | |
| 2011/0074333 | A1* | 3/2011 | Suzuki | B62D 5/0403 |
| | | | | 318/724 |
| 2012/0161689 | A1 | 6/2012 | Yamasaki | |
| 2013/0033210 | A1 | 2/2013 | Suzuki | |
| 2013/0099610 | A1 | 4/2013 | Suga | |
| 2013/0285591 | A1 | 10/2013 | Suzuki | |
| 2013/0320905 | A1 | 12/2013 | Uryu | |
| 2014/0009093 | A1 | 1/2014 | Suzuki | |
| 2014/0062375 | A1 | 3/2014 | Suzuki | |
| 2014/0097776 | A1 | 4/2014 | Hayashi | |
| 2014/0368150 | A1 | 12/2014 | Furukawa | |
| 2015/0084570 | A1 | 3/2015 | Hara | |

FOREIGN PATENT DOCUMENTS

| | | |
|---|---|---|
| DE | 10053818 A | 5/2002 |
| DE | 102010017521 A | 2/2011 |
| DE | 102011051234 A | 12/2011 |
| DE | 102011056920 A | 6/2012 |
| DE | 102014113105 A | 3/2015 |
| EP | 2 757 023 A | 7/2014 |
| JP | 2014007784 A | 1/2014 |
| WO | 2014115275 A | 7/2014 |

\* cited by examiner

ELECTROMECHANICAL POWER STEERING SYSTEM

CROSS REFERENCE TO RELATED APPLICATIONS

This application is a U.S. National Stage Entry of International Patent Application Serial Number PCT/EP2015/068379, filed Aug. 10, 2015, which claims priority to German Patent Application No. DE 10 2015 213 304.4 filed Jul. 15, 2015, and German Patent Application No. DE 10 2015 208 081.1 filed Apr. 30, 2015, the entire contents of all of which are incorporated herein by reference.

FIELD

The present disclosure generally relates to electromechanical power steering systems, including electromechanical power steering systems in motor vehicles and methods of operating power steering systems.

BACKGROUND

The increasing further development of electromechanical power steering systems has resulted in the demands placed on the stability and reliability of such power steering systems steadily rising. An important requirement in this case is for a steering assistance function to be maintained even in the event of sensors and/or parts of the control system or parts of the electric motor failing.

DE10053818A1 discloses a solution in which a redundant servo motor is used, the said servo motor having two windings which are independent of one another and which are driven by two inverters which are independent of one another and, for their part, are driven by a redundant control arrangement, so that redundancy is ensured in the event of a fault. However, the proposed solution is very complicated since two independent control devices which are separate from one another are required.

JP20147784A likewise discloses a solution in which a servo motor is provided, the said servo motor having two windings which are independent of one another and which are driven by two inverters which are independent of one another, so that redundancy is ensured in the event of a fault. This solution is also relatively complicated.

Thus a need exists for an electromechanical power steering system that has improved redundancy behavior and is simple and cost-effective in terms of design.

DETAILED DESCRIPTION

Figure 1:
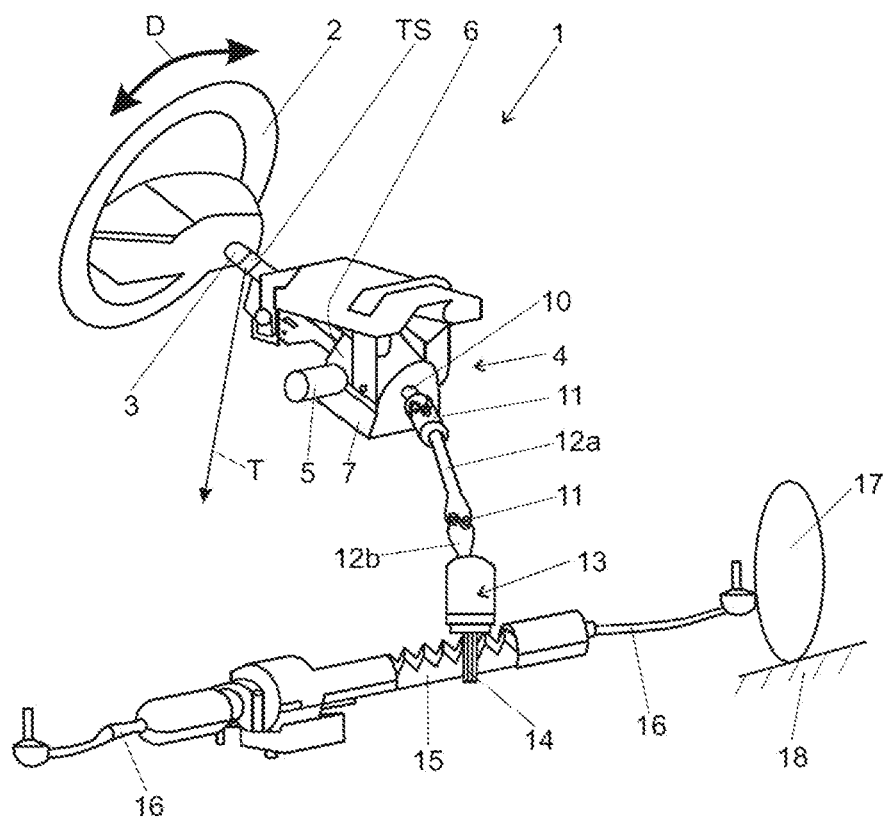
FIG. 1 is a perspective view of an example electromechanical power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The electromechanical power steering system for a motor vehicle according to the invention comprises
an electric motor having a stator, which is fitted with at least two electrical winding sets, and having a rotor, which is fitted with permanent magnets, which electric motor assists the steering movement, which is introduced into an input means by a motor car driver, in order to support a steering movement on the motor car,
a main control unit which determines a motor current prespecification, which is intended to be output to the electrical winding sets, from at least one steering value which characterizes the steering movement which is introduced by the vehicle driver, whereby the main control unit comprises a basic controller,
at least one power control unit which provides the motor current prespecification, which is determined in the main control unit, and feeds the said motor current prespecification to the electrical winding sets, wherein, for each of the windings sets, according to the invention, at least
one driver control system is provided, wherein all driver control systems and the basic controller as part of the main control unit each have a microcontroller and are combined to form one assembly,
and one power driver which is connected to one of the driver control systems is provided, wherein at least two power drivers are arranged in a power control unit, and each power driver is designed as a half-bridge with power semiconductor switches.

The entire control device can be designed in a simpler and more cost-effective manner as a result.

The electric motor is in the form of a brushless DC motor, also called BLDC motor. This type of motor provides the option of electronic commutation, in which the individual windings can be driven and supplied with current depending on the rotor position, the motor rotation speed and/or the torque. As a result, the motor characteristics can be matched in an optimized manner to the respective operating requirement, for example in respect of the start-up behaviour, the exerted torque, the rotation rate and the like.

In an electromechanical power steering system according to the invention, the respective operating requirement for a steering command which is input into the steering system by the motor car driver is ascertained on the basis of measured or prespecified operating parameters, for example the rotor position of the electric motor, which corresponds to the angular position of the steering shaft, and the torque which is applied to the steering shaft, and/or possibly further parameters. The sensors provided may be a torque sensor (torque sensor unit: TSU) and a rotor position sensor (RPS) which transmit their measurement values as prespecified steering values to the main control unit, especially to the basic controller. The main control unit comprises a microcontroller which calculates a motor current prespecification, which indicates the currents to be fed to the individual windings, in accordance with a prespecified algorithm. According to the invention, a control signal, which contains all information about the motor current prespecification, as example a demand torque of the electric motor, is transmitted by the basic controller of the main control unit in each case to a driver control system which is in each case associated with an electrical winding set of the motor. Accordingly, an electric motor having two winding sets contains two driver control systems which receive control signals from the basic controller of the main control system.

The driver control systems, also referred as to gate driver units of GDU, take over processing and conversion of the control signals, and, for their part, drive power drivers which convert the weak-current control signals, which are emitted by the driver control systems, into motor currents, that is to say the currents which are fed to the individual windings and are relatively high if required. Power control is performed by means of power semiconductor switches, for example MOSFETs (metal-oxide-semiconductor field-effect transistors) or IGBTs (insulated-gate bipolar transistors), which are connected in half-bridges.

According to the invention, the driver control systems are likewise in the form of intelligent control systems. This means that not only are control signals which are emitted by the basic controller of the main control unit produced, but also that each of the driver control systems can perform control tasks independently in accordance with a prespecified algorithm. To this end, the driver control systems can communicate not only with the basic controller of the main control unit via control or communication lines, but directly interchange data with one another via a direct control or communication line. As a result, it is possible, for example, for a first driver control system to be immediately informed about a second driver control system failing, and for a back-up or emergency control system to be activated in accordance with an algorithm which is installed in the first driver control system. Reliable, redundant control can be achieved in this way.

For implementation in practice, each of the driver control systems can comprise a microcontroller in which programs are installed which control the communication and the interchange of data with the basic controller and also between the driver control systems. Given a correspondingly powerful design of the microcontroller, it is possible for the driver control systems to be able to make up for a failure of the main control unit or of driver control systems, that is to say it is possible for the said driver control systems to take over the control functions of the basic controller or of inactive driver control systems. According to the invention, this is made possible by both the basic controller and the driver control systems each receiving all measurement signals from the sensors, that is to say by the said main control unit and the driver control systems being connected to the sensors via lines, and by all driver control systems being connected to the basic controller of the main control unit and to one another in each case, that is to say communication and control lines being arranged between all microcontrollers in the basic controller and all driver control systems. A redundant control system is formed as a result.

Very robust operation of the electromechanical power steering system, the said operation not been susceptible to faults, can be provided by the method for operating the electromechanical power steering system in which at least one sensor is connected to a redundant system comprising at least one microcontroller of the basic controller and one microcontroller of the driver control systems, it being possible for measurement signals to be emitted to all microcontrollers by the said sensor, wherein, in the event of failure of one of the microcontrollers, the remaining microcontroller or microcontrollers takes/take over driving of at least one of the power drivers.

The system for implementing the method advantageously comprises, as a sensor, a rotation position sensor of the electric motor and/or a torque sensor and/or rotation angle sensor. The angular position of the steering shaft and/or the steering torque which is introduced into the steering shaft by the motor car driver by means of the steering wheel can be detected by means of the torque sensor and/or rotation angle sensor and can be output as an electrical measurement values which are passed on to the main control unit and all driver control systems.

In order to simplify the design, as many elements of the electrical control system as possible are combined to form one physical unit, and preferably are even arranged on one printed circuit board (PCB). In this case, the components for the control system, which are designed for processing and passing on signal currents, the main control unit or rather the basic controller and/or the driver control systems are preferably arranged separately from the components which are designed to implement the power currents which move the electric motor, the power drivers. As a result, the main control unit including the basic controller and the driver control systems can have a compact construction, while optimum cooling can be provided for the power drivers.

The system preferably has one single basic controller. More preferably the system has one single main control unit.

At least two of the power drivers are advantageously arranged on a common printed circuit board. As a result, a compact construction can firstly be realized, and secondly a different thermal drift of the semiconductor components used, such as the power semiconductor switches, can be prevented or compensated for by thermal coupling.

However, it is particularly preferred in this case to arrange all the power drivers on a singular common printed circuit board. In addition to the said advantages, this design is advantageous in respect of production.

It is likewise advantageous when at least two of the driver control systems are arranged on a common printed circuit board. This is advantageous in respect of a compact design which permits efficient production and installation.

However, it is preferred in this case when all driver control systems are arranged on a singular common printed circuit board.

A particularly compact construction can be achieved when the driver control systems and the basic controller to build up the main control unit are, as far as possible all, arranged on a singular common printed circuit board.

The input means for inputting the prespecified steering value is preferably a control wheel which is driven by a motor car driver by rotation, as is known as a steering wheel in the prior art. However, it is also feasible and possible to use a joystick or another input means. The use of the invention is also suitable in the case of the electromechanical power steering system being designed as a steer-by-wire steering system in which the system has no mechanical connection between the input means which is operated by the motor car driver, for example the control wheel, and the steered vehicle wheels.

It is preferred when the prespecified steering value is a torque which is introduced into the input means, preferably the control wheel.

Specifically in the case of a steer-by-wire arrangement, but not only then, it is also preferred to define a rotation angle which is introduced into the input means, preferably the control wheel, as a prespecified steering value.

The main control unit, and especially preferred the basic controller, is advantageously connected to a CAN bus by means of which further signal variables which are suitable or necessary for controlling the electromechanical power steering system are transmitted to the main control unit, and/or feedback signals are transmitted from the main control unit to further control units in the motor vehicle.

Data is interchanged between interlinked control devices by means of the CAN bus in the vehicle in accordance with a standardized, serial bidirectional data transmission protocol which is common in vehicle construction. Examples of the said data include, in particular, the vehicle speed, the yawing moment and also a measured vehicle steering angle. A large number of steering assistance functions can be introduced into the system in this way. Possible examples include upstream functions for steering control.

The following functions can be mentioned here by way of example: a parking assistance function, in particular automatic parking; a lane-keeping assistance function; an automatic driving function in which the motor car driver does not perform any steering actions; vehicle speed-dependent assistance; implementation of a limit for the steering lock; a set operating mode; pull-drift compensation (compensation of crosswinds or roads which are inclined transverse to the direction of travel); compensation of moments of inertia in the steering system; identification of whether the motor car driver is controlling or has let go of the control wheel; compensation of friction in the steering system and/or on the carriageway; software-controlled protection of mechanical end stops in the steering system; producing a feeling for the motor car driver to enable him to drive the vehicle in a straight line (=centre point feeling); active return of the wheels from a turned position to the straight position if desired; active damping of vibrations and interference pulses which are produced by the chassis, by the road or by the steering system; compensation of rotational non-uniformities from Cardan joint transmissions of steering movements; prevention of overloading of the ball screw drive; compensation of hysteresis in the steering behaviour of the steering system, and the like.

The electric motor preferably has precisely two winding sets which are each formed from three winding phases U, V, W, also known as phase windings. However, it is also feasible and possible to provide more than two winding sets which are each formed from three individual winding phases U, V, W.

The winding sets are preferably always arranged alternately over the circumference of the stator.

However, it is also feasible and possible to arrange each of the winding phases of the winding sets jointly in the same circumferential position on the stator.

Furthermore, a rotor position sensor can be provided, it being possible for a measurement signal which corresponds to the angular position and/or to the electrical angular position of the rotor of the electric motor or of the steering shaft to be emitted to the main control unit or rahter the basic controller and/or the driver control systems by the said rotor position sensor. The rotor position sensor can preferably be of redundant design, for example by double or multiple sensor elements which can identically compensate for failure of a sensor element, or by sensor elements which can be operated in accordance with different measurement methods in order to be able to provide a back-up or emergency functionality in the event of a fault.

At least one torque sensor and/or rotation angle sensor is advantageously provided, it being possible for a measurement signal which corresponds to the torque position and/or to the angular position of a steering shaft, which is connected to the control wheel, to be emitted to the main control unit or rather the basic controller and/or the driver control systems by the said torque sensor and/or rotation angle sensor. The torque sensor and/or rotation angle sensor can preferably be of redundant design, for example by double or multiple sensor elements which can identically compensate for failure of a sensor element, or by sensor elements which can be operated in accordance with different measurement methods in order to be able to provide a back-up or emergency functionality in the event of a fault.

In order to increase the redundancy, the basic controller of the main control unit is advantageously connected to the driver control systems and the driver control systems are advantageously connected to one another via communication lines in each case. As a result, in the event of failure of one or more of the units, the remaining basic controller unit and/or driver control unit can take over driving of one of the winding sets, so that an assistance function for the electromechanical power steering system is still ensured. Accordingly, the microcontroller of the basic controller and of the driver control systems preferably form a redundant system in respect of the failure of at least one of the microcontrollers. The programs running on the microcontrollers allow, in particular, identification of the system state, that is to say a continuous system diagnosis which indicates whether the basic controller, the driver control systems and the connected sensors are operational or have failed. A back-up or emergency mode is activated depending on the result of the diagnosis.

FIG. 1 shows an electromechanical power steering system 1. The power steering system 1 comprises, as input means, a control wheel 2 into which the motor car driver, not shown, of the motor vehicle introduces a rotation D which defines the prespecified steering value as torque T from a torque sensor TS. In this case, the rotation is transmitted to an upper steering shaft 3 and introduced into a servo unit 4. The servo unit 4 comprises an electric motor 5, a step-down gear mechanism 6 and a control system 7. Owing to the rotation of the rotor 8 (cf. FIG. 6) in relation to the stator 9 (cf. FIG. 6), an auxiliary force is superimposed on the steering movement which is imposed by the motor car driver and therefore assists the motor car driver with the steering movement. The rotation of the upper steering shaft 3 is transmitted to the output shaft 10 by means of the gear mechanism and in a manner assisted by the servo unit 4, and transmitted to the steering mechanism 13 by means of Cardan joints 11 with the interconnection of intermediate shafts 12a and 12b. In the steering mechanism 13, the rotation is converted into a displacement of the toothed rack 15 by means of a steering pinion 14 which is connected in a rotationally fixed manner to the intermediate shaft 12b. The displacement in the toothed rack 15 leads to displacement of the tie rods 16 and therefore pivoting of the wheels 17 in relation to the road 18.

Figure 8:
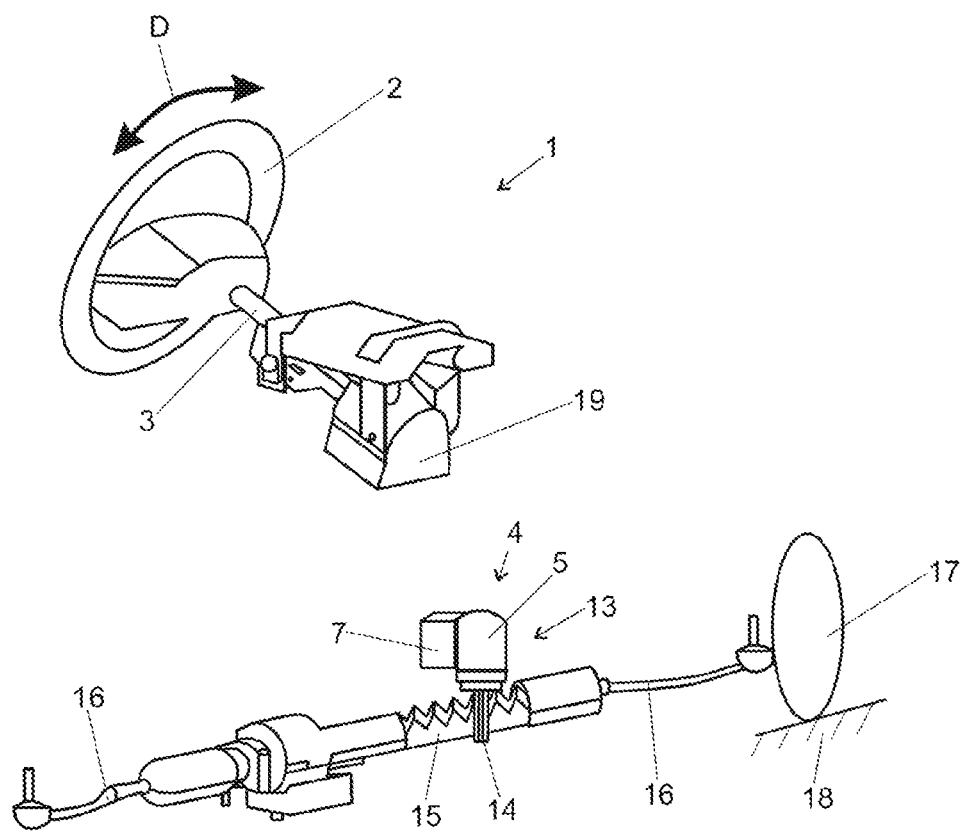
FIG. 8 is a perspective view of an example electromechanical power steering system of steer-by-wire design.

The system can also be designed as a steer-by-wire system, as is illustrated in FIG. 8. Here, the electric motor 5 is arranged directly in the steering mechanism 13 by way of example. A feedback actuator 19 provides the motor car driver with the feeling of really driving the vehicle on the road. To this end, corresponding counter torques against the rotation of the upper steering shaft 3 are applied in the feedback actuator 19. There is no mechanical connection or coupling in the sense of the steering effect between the upper steering shaft 3 and the steering mechanism. The manner of operation is analogous to the manner of operation described in relation to FIG. 1, and therefore is not described again.

Figure 2:
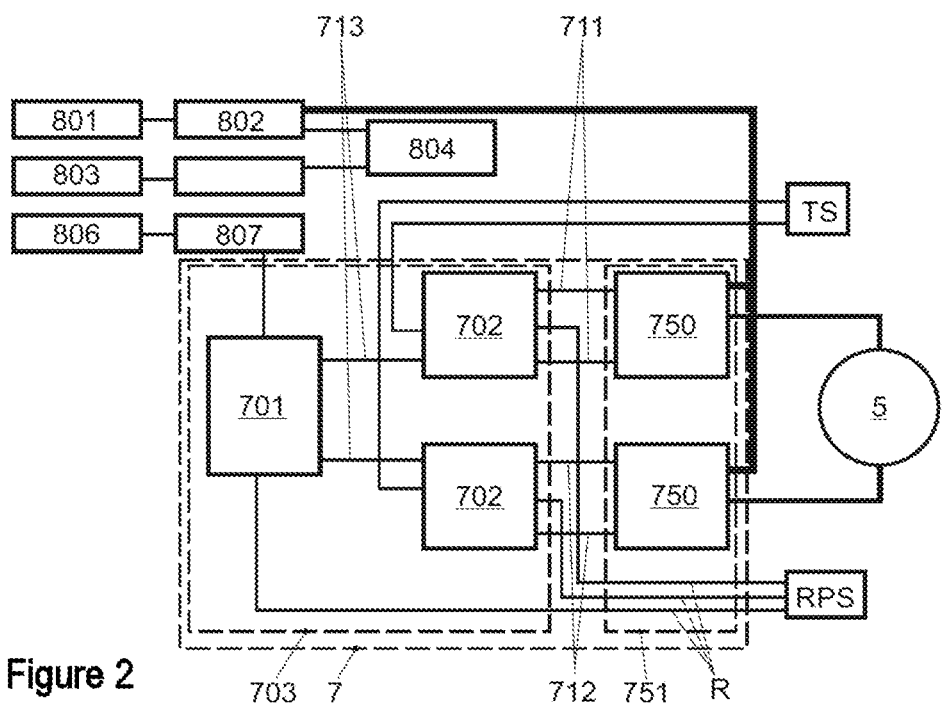
FIG. 2 is a schematic block diagram of an example control system.
Figure 3:
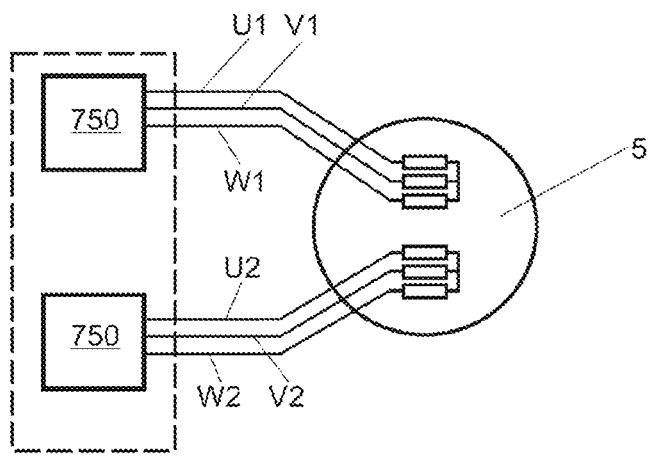
FIG. 3 is a detailed view from FIG. 2 illustrating driving of winding phases.

FIG. 2 schematically illustrates the control system 7. FIG. 3 shows a detail of the said control system, which detail illustrates driving of the winding phases U, V, W. The designation U, V, W for the winding phases is in this case the general term for the winding phases U1, V1, W1 of the first winding set and the winding phases U2, V2, W2 of the second winding set.

Figure 5:
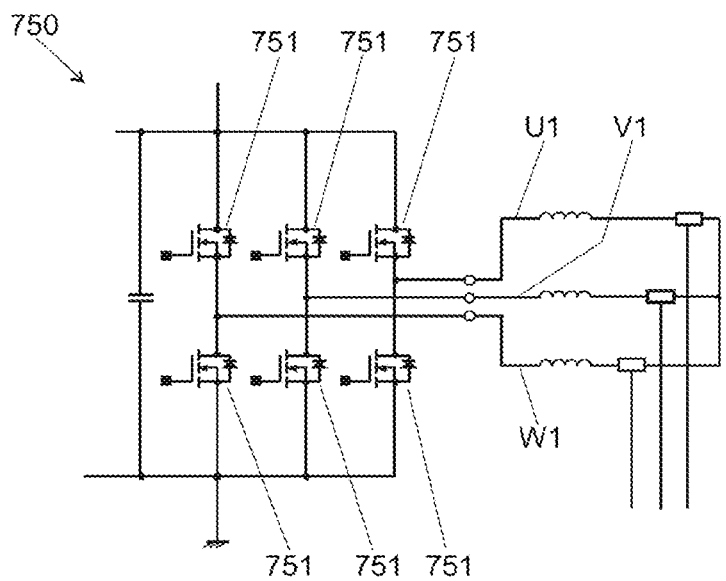
FIG. 5 is a schematic view of an example half-bridge of a power driver.

FIG. 5 illustrates the half-bridge circuit comprising the MOSFET switches 751, which half-bridge circuit is contained in the power driver 750. The control system 7 comprises the basic controller 701 and two driver control systems 702 which are arranged on the common printed circuit board 703a to build the main control unit 703. The two power drivers 750 are arranged on the common printed circuit board 751a to buld the power control unit 751. The measurement signals from the torque sensor TS and the rotor position sensor RPS are supplied directly to the driver control systems 702, so that the said driver control systems can use the said measurement signals to determine the driver signals 711, 712 for driving the power drivers 750 with the inclusion of the prespecified values 713. In this case, the determination process is performed by a target torque TD being determined in the basic controller 701 on the basis of the introduced torque T. The target torque TD is supplied to the two driver control systems 702. A current prespecification id,d; iq,d is determined in the coordinate system, which rotates with the electrical angle, on the basis of this target torque TD with the aid of the electrical angle R of the electric motor 5. In a further coordinate transformation, the prespecified values for the voltages Uα, Uβ are calculated therefrom in the coordinate system, which is fixed to the stator 9. These values are then passed on to the respective power drivers 750, the inverters, by the respective driver control systems 702. In the power drivers, the motor currents Iu, Iv, Iw which are supplied to the respective winding phases U1, V1, W1 and U2, V2, W1, W2 are determined from the said values. The motor currents are determined in accordance with the known pulse-width modulation process (=PWM).

A power supply 801, a radio interference-suppression filter 802, an ignition switch control means 803, and a system base chip 804 are further provided to show the functions.

A CAN bus 806 is electrically connected to the main control unit 701 by means of an interface module 807, so that signals can be exchanged between the motor vehicle and the main control unit 701.

In the event of a power driver 750 being defective and/or a driver control system 702 and/or a winding being interrupted, the motor 5 can be driven by means of the remaining units. Eventually, the full power will no longer be available. However, the full power of the motor 5 is required only during parking and during manoeuvring processes when travelling at low speed. In these cases, reduced steering assistance is indeed disadvantageous but not dangerous. The dangerous ranges when driving on the motorway or driving cross-country on country roads can be effectively prevented with a safety architecture of this kind. In this case, it is readily feasible and possible to use a warning light and/or a warning noise to request the motor car driver to stop the vehicle as soon as possible.

Figure 7:
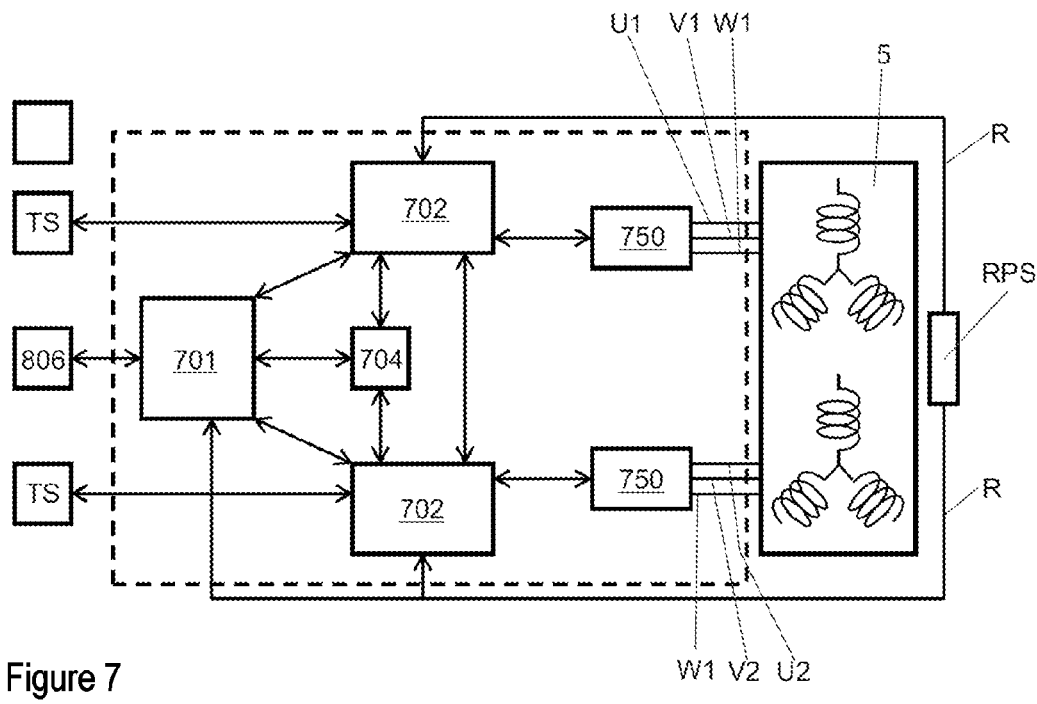
FIG. 7 is a schematic view of a block diagram of another example controller.

FIG. 7 shows a preferred embodiment of the invention, in which, in addition to the components already described in FIG. 2, a reset controller 704 is provided, the said reset controller 704 allowing the system to be reset and in this way making it possible for the system to be restarted in a simple manner. Furthermore, two-way signal connections are shown by the arrows, the said two-way signal connections allowing only one single control unit from amongst the selection of the basic controller 701 and the driver control systems 702 to be designed to take over driving of the at least one power driver 750 in the event of a fault in other units. In a preferred embodiment the said reset controller 704 is allowing the reset of one single control unit from amongst the selection of the main control unit 701 and the driver control systems 702. This can be done, if two of these control units vote for the reset of the remaining control unit.

Figure 6:
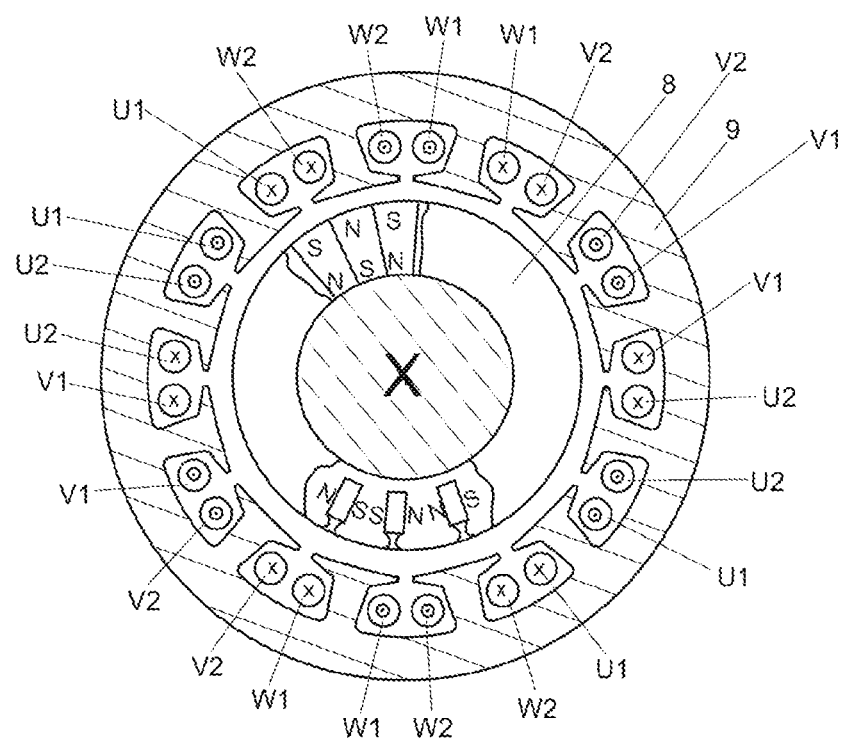
FIG. 6 is a schematic view of example winding phases in an electric motor.

FIG. 6 illustrates a winding diagram for the winding phases U, V, W with the individual winding phases U1, V1, W1 and U2, V2, W2. The winding sets of the winding phases are always alternately arranged in a manner distributed over the circumference of the stator 9. The said figure illustrates two possible variants for arranging the permanent magnets in the rotor 8 with the north poles N and south poles S.

Figure 4:
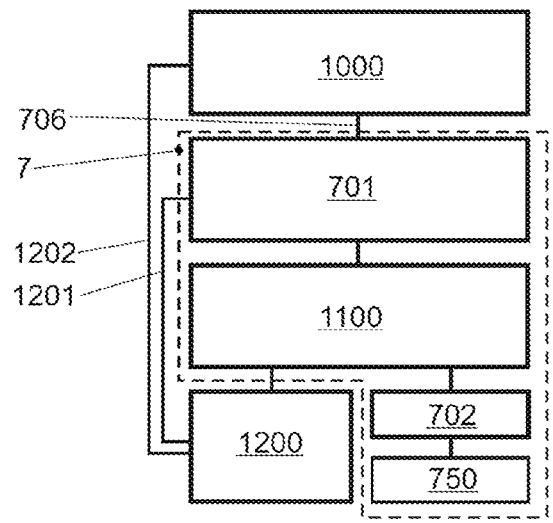
FIG. 4 is a block diagram illustrating steering control.

FIG. 4 illustrates, using a block diagram, the embedding of the control system 7 into the system for controlling the entire motor vehicle.

The steering control system is illustrated in block 1000, the said head steering control system providing some or all of the abovementioned steering assistance functions on the basis of sensor signals, prespecified values and others, and initiating the said steering assistance functions in the control system 7 and, there, in particular in the basic controller 701 by means of the CAN bus 706. A specific adjustment level 1100, which is specifically designed depending on the application, is arranged between the basic controller 701 and the driver control system 702, and also the sensor block 1200. Here, signal values, for example the measured currents in the winding phases or the measured torque or the measured electrical angle, are matched to the sensor characteristics of the respective motor vehicle. At the same time, the output values for the prespecified values 713 are matched to the respectively used electric motor 5 here. A first control loop for controlling the motor power, a so-called motor control loop, is formed with a first signal feedback 1201 to the driver control system 702. A second control loop for steering control, a so-called steering control loop, is formed with a second signal feedback 1202 to the head steering control system 1000. A third control loop for steering control, a so-called low steering control loop, is formed with a third signal feedback 1203 to the basic controller 701. In this way, the abovementioned steering assistance functions can be carried out in a manner matched to the specific type of vehicle. The same basic controller 701 and driver control systems 702 can always be used for different types of vehicle on account of the adjustment level 1100. The adjustment level can be inserted, in the form of a memory module which contains a software code and is equipped with defined interfaces to the microcontroller in the basic controller 701 and to the microcontroller in the driver control system, in a simple manner into a prepared insertion slot in the printed circuit board 703a of the main control unit 703 on which the basic controller 701 is arranged. As a result, matching can be performed solely by exchanging the memory module.

What is claimed is:

1. An electromechanical power steering system for a motor vehicle comprising:
    an electric motor having a stator that is fitted with at least two electrical winding sets, the electric motor having a rotor that is fitted with permanent magnets, wherein the electric motor assists with steering by exerting a steering movement, which is introduced into an input means by a driver, on the motor vehicle;
    a main control unit that comprises a basic controller and that determines a motor current prespecification, which is configured to be output to the at least two electrical winding sets, from a prespecified steering value based on the steering movement that is introduced by the driver;
    a power control unit that provides and feeds the motor current prespecification, which the main control unit determines, to the at least two electrical winding sets;
    a driver control system for each of the at least two electrical winding sets, wherein the driver control systems and the basic controller of the main control unit each include a microcontroller and are combined to form an assembly; and
    a power driver for each of the at least two electrical winding sets, wherein each power driver is connected to one of the driver control systems, wherein at least two of the power drivers are disposed in the power control unit and are configured as half-bridges with power semiconductor switches,
    wherein the microcontrollers of the basic controller and the driver control systems form a redundant system with respect to a failure of at least one of the microcontrollers.

2. The electromechanical power steering system of claim 1 wherein at least two of the power drivers are disposed on a common printed circuit board.

3. The electromechanical power steering system of claim 1 wherein all of the power drivers are disposed on a common printed circuit board.

4. The electromechanical power steering system of claim 1 wherein at least two of the driver control systems are disposed on a common printed circuit board.

5. The electromechanical power steering system of claim 1 wherein all of the driver control systems are disposed on a common printed circuit board.

6. The electromechanical power steering system of claim 1 wherein the driver control systems and the basic controller are disposed on a common printed circuit board.

7. The electromechanical power steering system of claim 1 wherein the prespecified steering value is a torque that is introduced into the input means.

8. The electromechanical power steering system of claim 1 wherein the prespecified steering value is a rotation angle that is introduced into the input means.

9. The electromechanical power steering system of claim 1 wherein at least one of the main control unit or the basic controller is connected to a CAN bus by way of which signal variables for controlling the electromechanical power steering system are transmitted to the main control unit, and/or feedback signals are transmitted from the main control unit and/or the basic controller to a control unit in the motor vehicle.

10. The electromechanical power steering system of claim 1 wherein each of the at least two electrical winding sets is formed by three individual winding phases U, V, W, wherein the at least two electrical winding sets are disposed alternately over a circumference of the stator.

11. The electromechanical power steering system of claim 1 wherein each of the at least two electrical winding sets is formed by three individual winding phases U, V, W, wherein the three individual winding phases U, V, W of the at least two electrical winding sets are disposed in a same circumferential position on the stator.

12. The electromechanical power steering system of claim 1 further comprising a rotor position sensor configured to emit a measurement signal corresponding to an angular position of the rotor of the electric motor or of a steering shaft to at least one of the main control unit or the driver control systems.

13. The electromechanical power steering system of claim 1 further comprising at least one of a torque sensor or a rotation angle sensor configured to emit a measurement signal corresponding to a torque and/or an angular position of a steering shaft to at least one of the main control unit, the basic controller, or the driver control systems.

14. The electromechanical power steering system of claim 1 wherein the basic controller is connected to the driver control systems, wherein the driver control systems are connected to one another via communication lines.

15. A method for operating an electromechanical power steering system for a motor vehicle comprising an electric motor having a stator that is fitted with at least two electrical winding sets, the electric motor having a rotor that is fitted with permanent magnets, wherein the electric motor assists with steering by exerting a steering movement, which is introduced into an input means by a driver, on the motor vehicle; a main control unit that comprises a basic controller and that determines a motor current prespecification, which is configured to be output to the at least two electrical winding sets, from a prespecified steering value based on the steering movement that is introduced by the driver; a power control unit that provides and feeds the motor current prespecification, which the main control unit determines, to the at least two electrical winding sets; a driver control system for each of the at least two electrical winding sets, wherein the driver control systems and the basic controller of the main control unit each include a microcontroller and are combined to form an assembly; and a power driver for each of the at least two electrical winding sets, wherein each power driver is connected to one of the driver control systems, wherein at least two of the power drivers are disposed in the power control unit and are configured as half-bridges with power semiconductor switches, the method comprising connecting a sensor to a redundant system comprising the microcontroller of the basic controller and one of the microcontrollers of the driver control systems, wherein the sensor is configured to emit measurement signals to the microcontrollers, wherein upon failure of one of the microcontrollers the other microcontroller takes over driving of at least one of the at least two power drivers.

16. The method of claim 15 wherein the sensor comprises at least one of:
    a rotation position sensor of the electric motor or of the steering shaft;
    a torque sensor; or
    a rotation angle sensor.

* * * * *